United States Patent
Moon et al.

(10) Patent No.: US 7,855,741 B2
(45) Date of Patent: Dec. 21, 2010

(54) APPARATUS AND METHOD FOR PROCESSING IMAGE

(75) Inventors: Young-su Moon, Seoul (KR); Ho-jin Lee, Seoul (KR); Shi-hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 469 days.

(21) Appl. No.: 12/078,572

(22) Filed: Apr. 1, 2008

(65) Prior Publication Data

US 2009/0128662 A1 May 21, 2009

(30) Foreign Application Priority Data

Nov. 15, 2007 (KR) .................. 10-2007-0116899

(51) Int. Cl.
*H04N 3/14* (2006.01)
*H04N 5/228* (2006.01)
(52) U.S. Cl. .................... 348/273; 348/222.1
(58) Field of Classification Search ............. 348/273, 348/222.1
See application file for complete search history.

(56) References Cited

U.S. PATENT DOCUMENTS

2006/0238629 A1* 10/2006 Sato et al. ................. 348/241

FOREIGN PATENT DOCUMENTS

| JP | 2000-023173 | 1/2000 |
| JP | 2006-135564 | 5/2006 |
| KR | 10-2005-0123341 | 12/2005 |
| KR | 10-2007-0048904 | 5/2007 |

\* cited by examiner

*Primary Examiner*—James M Hannett
(74) *Attorney, Agent, or Firm*—Staas & Halsey LLP (57) ABSTRACT

Provided are an image signal processing apparatus and method. According to the image signal processing method, by simultaneously performing in an integrated manner image denoising and interpolation using 4-directional image gradient information which defines differences in color brightness between adjacent pixels on the basis of edge direction information obtained from a bayer image output from an image sensor, it is possible to improve picture quality and processing speed.

21 Claims, 10 Drawing Sheets

APPARATUS AND METHOD FOR PROCESSING IMAGE

CROSS REFERENCE TO RELATED APPLICATIONS

This application claims priority from Korean Patent Application No. 10-2007-0116899, filed on Nov. 15, 2007, the disclosure of which is incorporated herein in its entirety by reference.

BACKGROUND OF THE INVENTION

1. Field of the Invention

The present invention relates to an image signal processing (ISP) method and apparatus for processing images, and more particularly, to a technique for processing image signals sensed by an image sensor.

2. Description of the Related Art

In order to properly display a color image, three colors, that is, red (R), green (G), and blue (B) samples, should be necessary to each pixel. However, installing a plurality of color filters for filtering three colors from each pixel makes the structure of an image signal processing (ISP) apparatus complicated and is not preferred in view of costs.

For this reason, a digital image input apparatus, such as a digital camera and a cellular phone in which a camera is installed, uses a color filter array (CFA) such as a bayer filter for filtering only one color from each pixel to reduce the number of color samples. And, the bayer pattern, which is output by an image sensor, is processed by an image signal processor (ISP) to create an RGB full color image.

The image signal processor performs two important functions: one of which is an image denoising (or noise reduction) function for effectively eliminating or reducing noise existing in an image, and the other of which is an interpolation (or demosaicing) function for obtaining an RGB full color from color patterns output by an image sensor.

Figure 1:
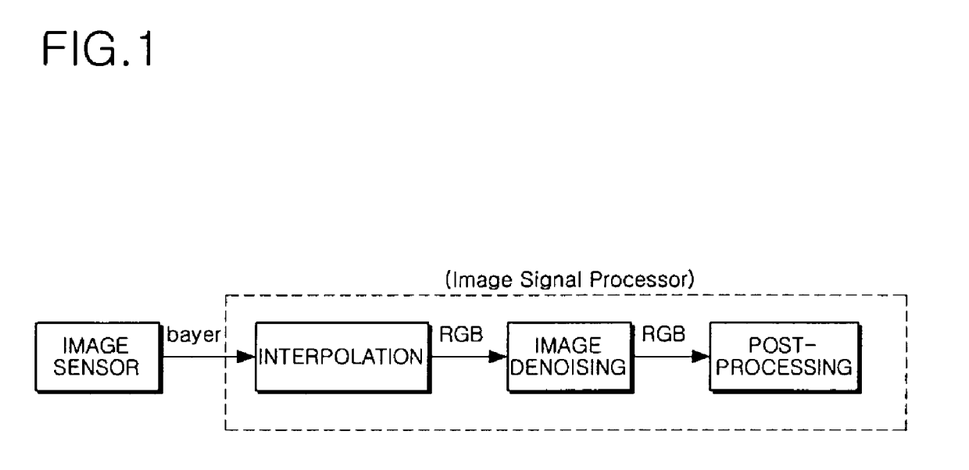
FIGS. 1 and 2 are views for explaining conventional image signal processing methods.
Figure 2:
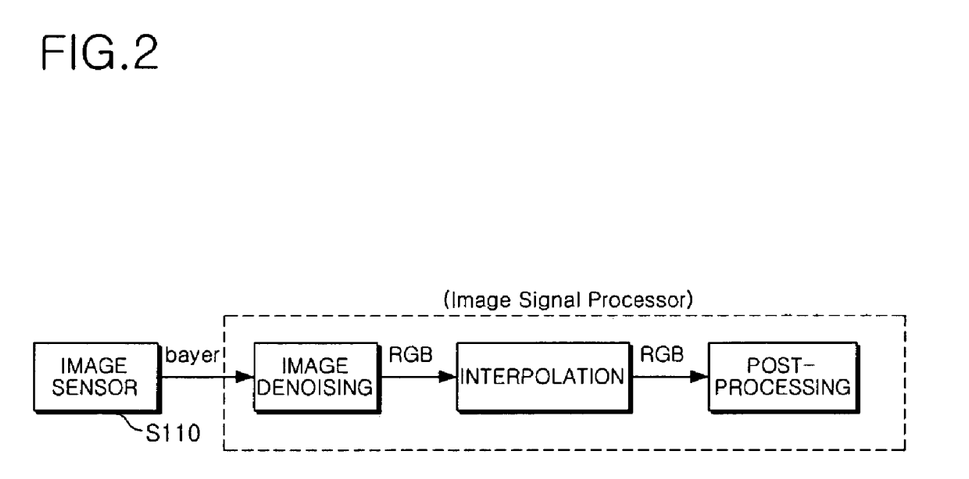

Generally, a method which performs interpolation and then performs image denoising, as illustrated in FIG. 1, or a method which performs image denoising and then performs interpolation, as illustrated in FIG. 2, is being widely utilized.

SUMMARY OF THE INVENTION

The present invention provides an image signal processing (ISP) apparatus and method which is effective in view of picture quality, processing speed, and economic performance by reducing the amount of calculations required to perform image denoising and interpolation.

Image denoising and interpolation are used for different purposes, but have a common feature in terms of using edge information of images. However, these common features have not been utilized to date.

Accordingly, the present applicant has conducted research on an image signal processing technique which is effective in view of picture quality, processing speed, and economic performance by performing in an integrated manner image denoising and interpolation using edge information of images. For this purpose, the present invention proposes a technique for simultaneously performing in an integrated manner image denoising and interpolation using 4-directional image gradient information which defines differences in color brightness between adjacent pixels on the basis of edge direction information obtained from a bayer image outputted from an image sensor.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure is thorough and will fully convey the scope of the invention to those skilled in the art. In the drawings, the size and relative sizes of layers and regions may be exaggerated for clarity. Like reference numerals in the drawings denote like elements.

Figure 3:
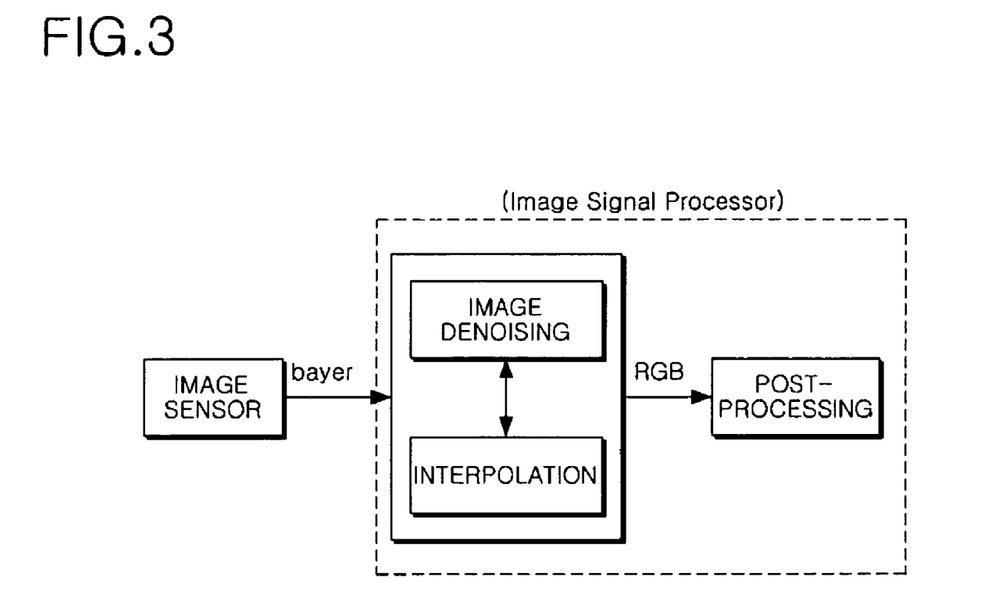
FIG. 3 is a view for explaining an image signal processing (ISP) method according to an embodiment of the present invention.

FIG. 3 is a view for explaining an image signal processing method according to an embodiment of the present invention. As illustrated in FIG. 3, the image signal processing method according to this embodiment simultaneously performs in an integrated manner image denoising and interpolation, unlike a conventional method of sequentially performing image denoising and interpolation.

For this purpose, the image signal processing method performs image denoising and interpolation, simultaneously, using 4-directional image gradient information which defines differences in color brightness between adjacent pixels on the basis of edge direction information obtained from a bayer image output from an image. Embodiments for this process will be described in detail later.

Figure 4:
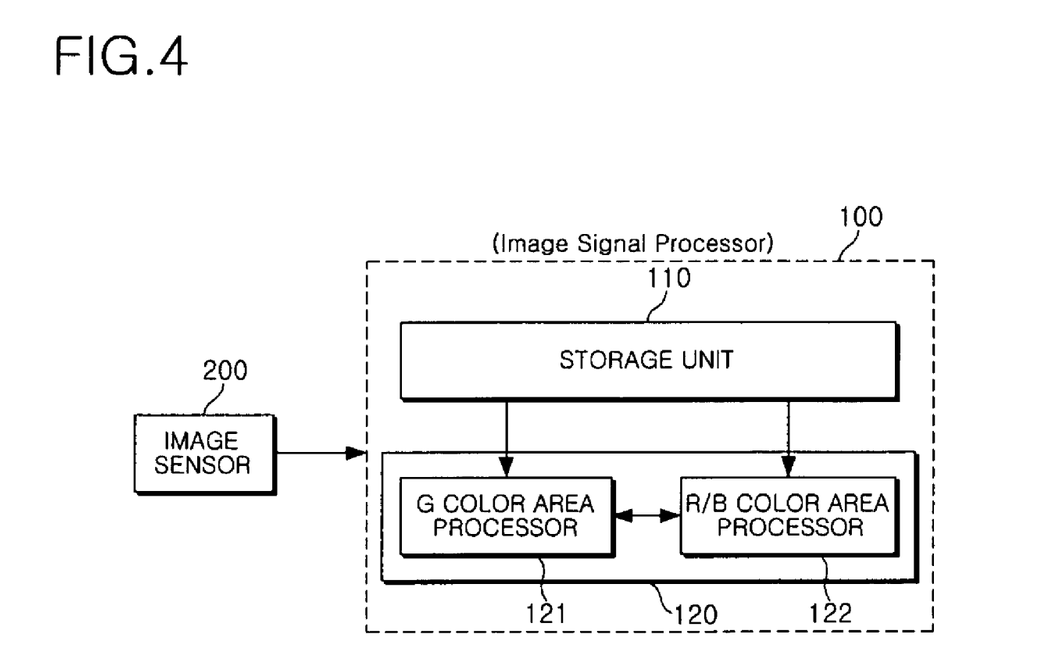
FIG. 4 is a block diagram of an image signal processing apparatus according to an embodiment of the present invention.

FIG. 4 is a block diagram of an image signal processing apparatus 100 according to an embodiment of the present invention. The image signal processing apparatus 100 processes image signals output from an image sensor 200, and includes a storage unit 110 and an image signal processing unit 120.

The storage unit 110 stores 4-directional image gradation information which defines differences in color brightness between adjacent pixels on the basis of edge direction information obtained from a bayer image output from the image sensor 200.

Figure 5:
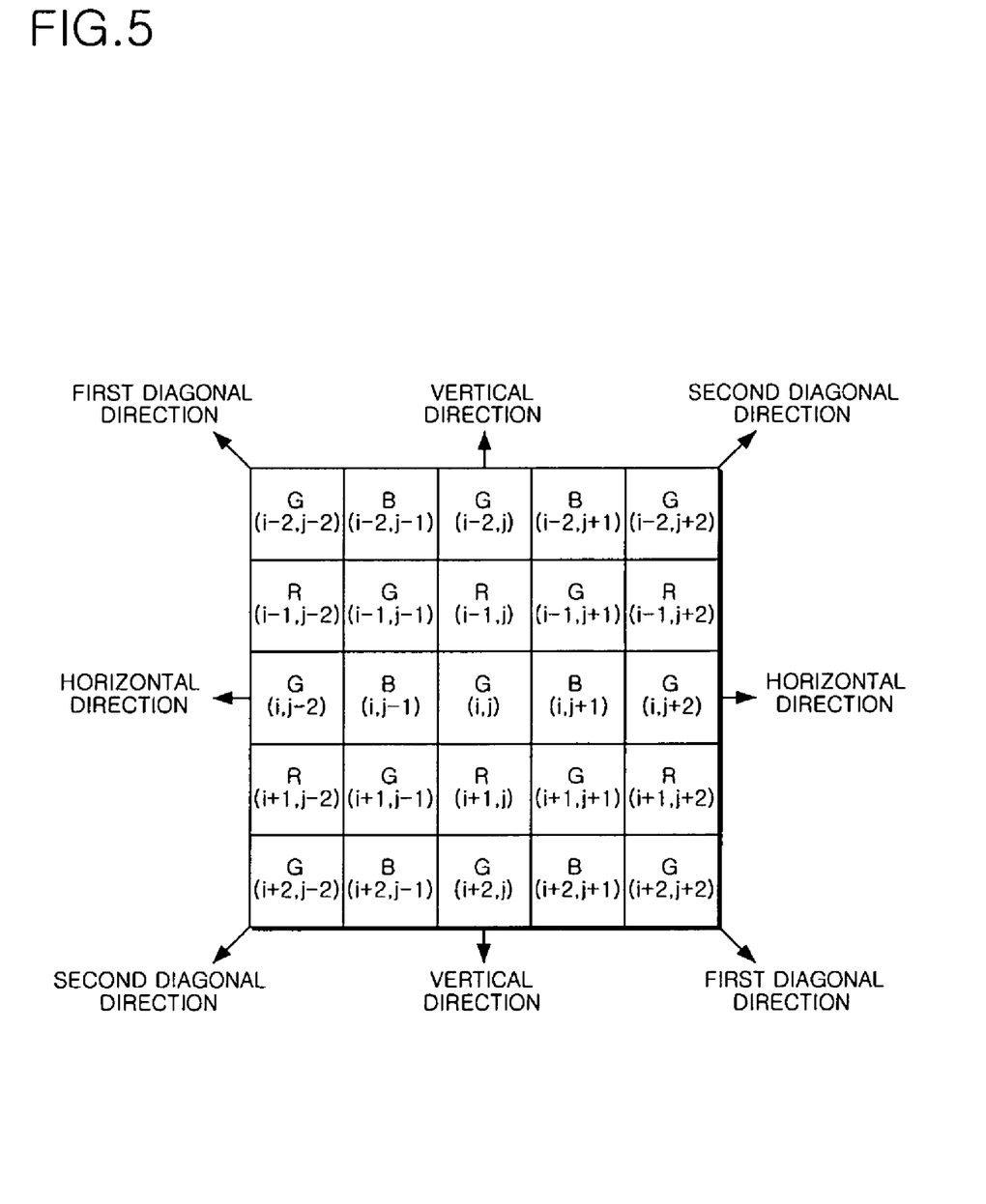
FIG. 5 shows a color pattern of a bayer image which is output from an image sensor.

For example, if the color pattern of the bayer image output from the image sensor 200 is the color pattern illustrated in FIG. 5, the edge directions of each color can be classified into four directions; a horizontal direction, a vertical direction, a first diagonal direction, and a second diagonal direction.

In the case of a G color, 4-directional image gradient information of each pixel coordinate is defined as $E_{GH}(i,j)$ representing a horizontal directional image gradient, $E_{GV}(i,j)$ representing a vertical directional image gradient, $E_{GD1}(i,j)$ representing a first diagonal directional image gradient, and $E_{GD2}(i,j)$ representing a second diagonal directional image gradient.

In the case of an R color, 4-directional image gradient information of each pixel coordinate is defined as $E_{RH}(i,j)$ representing a horizontal directional image gradient, $E_{RV}(i,j)$ representing a vertical directional image gradient, $E_{RD1}(i,j)$ representing a first diagonal directional image gradient, and $E_{RD2}(i,j)$ representing a second diagonal directional image gradient.

In the case of a B color, 4-directional image gradient information of each pixel coordinate is defined as $E_{BH}(i,j)$ representing a horizontal directional image gradient, $E_{BV}(i,j)$ representing a vertical directional image gradient, $E_{BD1}(i,j)$ representing a first diagonal directional image gradient, and $E_{BD2}(i,j)$ representing a second diagonal directional image gradient.

Equations used for calculating 4-directional image gradient information for each of R, G and B colors, as defined above, will be described in detail later.

The image signal processing unit 120 simultaneously performs image denoising and interpolation using the 4-directional image gradient information stored in the storage unit 110. In detail, the image signal processing unit 120 includes a G color area processor 121 and an R/B color area processor 122.

The G color area processor 121 performs image denoising and interpolation on G color areas, using the 4-directional image gradient information, and the R/B color area processor 122 performs image denoising and interpolation on R or B color areas using the 4-directional image gradient information and the G color areas interpolated by the G color area processor 121.

In detail, the G color area processor 121 performs image denoising on the G color of G color areas using the 4-directional image gradient information. Then, the R/B color area processor 122 performs image denoising on the R or B colors of R or B color areas using the 4-directional image gradient information, and interpolates the G color of the R or B color areas, subjected to image denoising, using the G color subjected to image denoising by the G color area processor 121.

The reason interpolation on the G color is performed first is to increase the effectiveness of performing RGB interpolation by first performing interpolation on the G color with the greater number of pixels, where the G color occupies about 50% of the color pattern of a bayer image output from the image sensor 200, and the R and B colors each occupies about 25% of the color pattern.

Then, the R/B image processor 122 interpolates the R or B color of the R or B color areas in which the G color has been interpolated. Then, the G color area processor 121 interpolates the R or B colors of the G color areas subjected to image denoising using the R or B colors of the R or B color areas subjected to image denoising, thereby creating an RGB full color image.

Accordingly, by simultaneously performing in an integrated manner image denoising and interpolation, using 4-directional image gradient information which defines differences in color brightness between adjacent pixels on the basis of edge direction information calculated from a bayer image output from the image sensor 200, the amount of calculations required for image denoising and interpolation can be reduced. Therefore, the image signal processing method according to the current embodiment of the present invention is more effective than the conventional method, in view of picture quality, processing speed, and costs.

Figure 6:
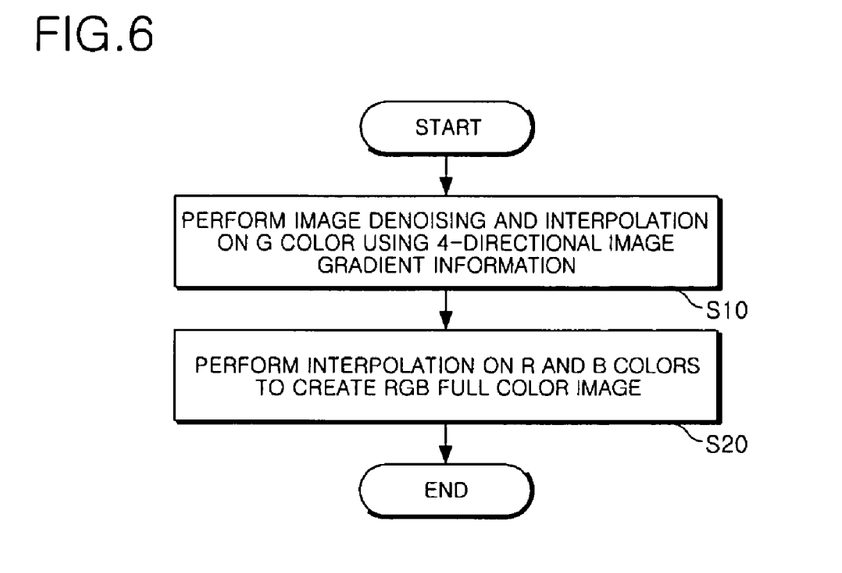
FIG. 6 is a schematic flowchart of an image signal processing method according to an embodiment of the present invention.

The image signal processing method of the image signal processing apparatus illustrated in FIG. 4 will now be described in detail with reference to FIG. 6. FIG. 6 is a schematic flowchart of an image signal processing method according to an embodiment of the present invention.

First, in operation S10, the image signal processing apparatus performs image denoising and interpolation on a G color, using 4-directional image gradient information.

Then, in operation S20, the image signal processing apparatus performs interpolation on R and B colors to create a RGB full color image.

Figure 7:
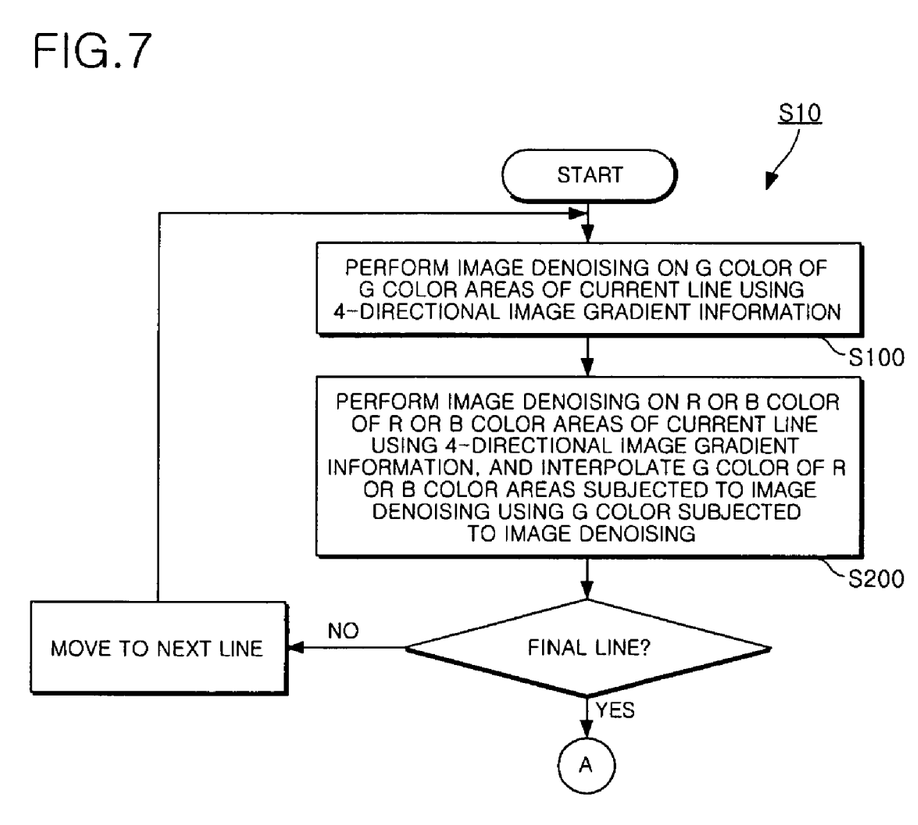
FIG. 7 is a flowchart of operation S10 illustrated in FIG. 6 according to an embodiment of the present invention.

FIG. 7 is a flowchart showing in detail operation S10 illustrated in FIG. 9. Operation S10 includes operation S100 in which the G color area processor 121 performs image denoising on the G color of G color areas using the 4-directional image gradient information, and operation S200 in which the R/B color area processor 122 performs image denoising on the R or B color of R or B color areas using the 4-directional image gradient information, and interpolates the G color of the R or B color areas subjected to image denoising using the G color subjected to image denoising by the G color area processor 121.

Figure 8:
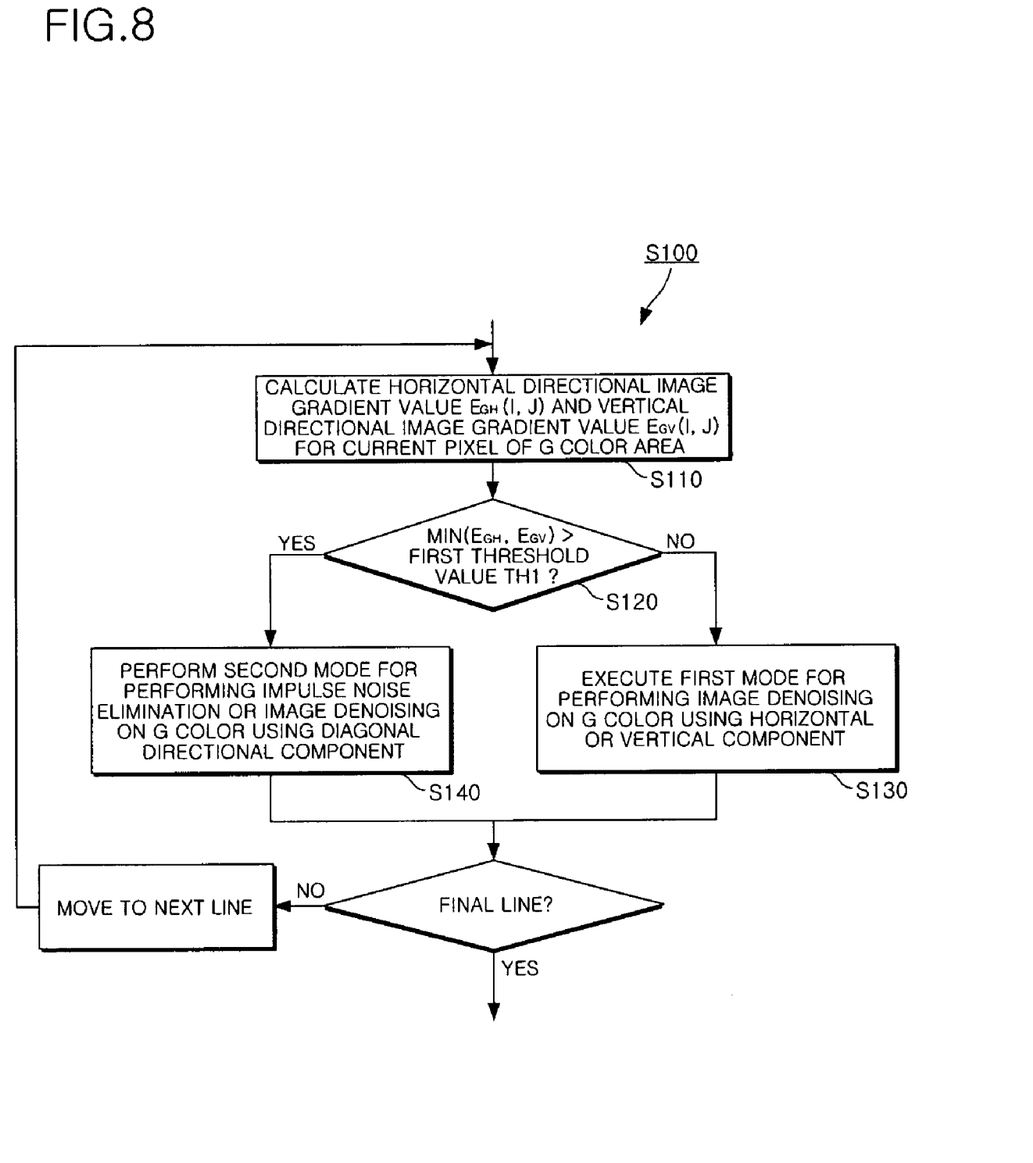
FIG. 8 is a flowchart of operation S100 illustrated in FIG. 7 according to an embodiment of the present invention.

FIG. 8 is a flowchart showing in detail operation S100 illustrated in FIG. 7.

Referring to FIGS. 4 and 8, in operation S110, the G color area processor 121 calculates a horizontal directional image gradient value $E_{GH}(i,j)$ and a vertical directional image gradient value $E_{GV}(i,j)$ for a current pixel of a G color area. Equations used for calculating the horizontal and vertical directional image gradient values $E_{GH}(i,j)$ and $E_{GV}(i,j)$ can be optimally defined in various ways by repeatedly performing experiments, etc.

For example, equations used for calculating the horizontal and vertical directional image gradient values $E_{GH}(i,j)$ and $E_{GV}(i,j)$ can be defined as follows:

$$E_{GH}(i,j)=|G(i,j-2)+G(i,j+2)-2G(i,j)|$$

$$E_{GV}(i,j)=|G(i-2,j)+G(i+2,j)-2G(i,j)|.$$

In the above equations, $G(i, j)$ represents a G value of a current coordinate, $G(i, j-2)$ represents a G value which is located to the left of the current coordinate on a G color area, G(i, j+2) represents a G value which is located to the right of the current coordinate on the G color area, G(i−2, j) represents a G value which is located above the current coordinate on the G color area, and G(i+2, j) represents a G value which is located below the current coordinate on the G color area.

Then, in operation S120, the G color area processor 121 compares the horizontal directional image gradient value $E_{GH}(i,j)$ with the vertical directional image gradient value $E_{GV}(i,j)$, selects the smaller value $MIN(E_{GH}, E_{GV})$ from the two values $E_{GH}(i,j)$ and $E_{GV}(i,j)$, and compares the selected value $MIN(E_{GH}, E_{GV})$ with a first threshold value Th1.

1) First Mode

If it is determined in operation S120 that the selected value $MIN(E_{GH}, E_{GV})$ does not exceed the first threshold value Th1, operation S130 proceeds, in which the G color area processor 121 executes a first mode for performing image denoising on the G color using a horizontal or vertical directional component. In the first mode, the horizontal directional image gradient value $E_{GH}(i, j)$ is compared with the vertical directional image gradient value $E_{GV}(i, j)$, and image denoising is performed on the G color according to the result of the comparison.

If the vertical directional image gradient value $E_{GV}(i, j)$ exceeds the horizontal directional image gradient value $E_{GH}(i, j)$, image denoising is performed on the G color of the current pixel using G color values which are in the horizontal direction. In other words, image smoothing is performed in the horizontal direction according to the following equation:

$$G(i,j)=\{G(i,j-2)+2G(i,j)+G(i,j+2)\}/4.$$

If the horizontal directional image gradient value $E_{GH}(i, j)$ exceeds the vertical directional image gradient value $E_{GV}(i, j)$, image denoising is performed on the G color of the current pixel using G color values which are in the vertical direction. In other words, image smoothing is performed in the vertical direction according to the following equation:

$$G(i,j)=\{G(i-2,j)+2G(i,j)+G(i+2,j)\}/4.$$

If the horizontal directional image gradient value $E_{GH}(i, j)$ is equal to the vertical directional image gradient value $E_{GV}(i, j)$, image denoising is performed on the G color of the current pixel using G color values which are in the horizontal and vertical directions. In other words, image smoothing is performed in both the horizontal and vertical directions, according to the following equation:

$$G(i,j)=\{4G(i,j)+G(i-2,j)+G(i+2,j)+G(i,j-2)+G(i,j+2)\}/8.$$

At this point, an equation used for performing image denoising on the G color can be optimally defined in various ways by repeatedly performing experiments, etc.

2) Second Mode

Meanwhile, if it is determined in operation S120 that the selected value $MIN(E_{GH}, E_{GV})$ exceeds the first threshold value Th1, operation S140 proceeds, in which the G color area processor 121 executes a second mode for performing impulse noise elimination and image denoising on the G color using impulse noise or diagonal components.

Figure 9:
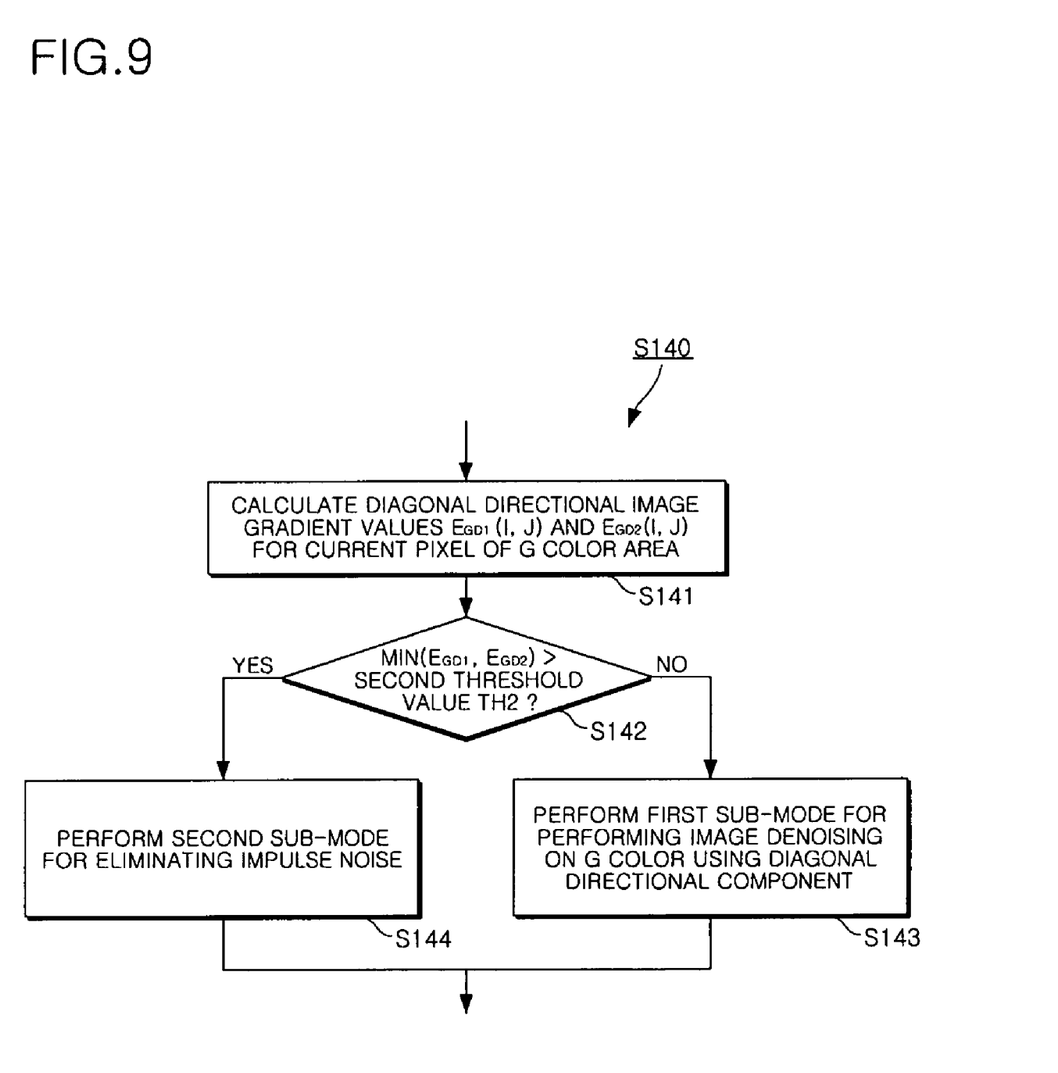
FIG. 9 is a flowchart of operation S140 illustrated in FIG. 8 according to an embodiment of the present invention.

FIG. 9 is a flowchart showing in detail the operation S140 illustrated in FIG. 8. In operation S141, first, the G color area processor 121 calculates first and second diagonal directional image gradient values $E_{GD1}(i, j)$ and $E_{GD2}(i, j)$ for the current pixel of the G color area. An equation used for calculating the first and second diagonal directional image gradient values $E_{GD1}(i, j)$ and $E_{GD2}(i, j)$ can be optimally defined in various ways by repeatedly performing experiments, etc.

For example, the first and second diagonal directional image gradient values $E_{GD1}(i,j)$ and $E_{GD2}(i, j)$ can be defined as follows:

$$E_{GD1}(i,j)=|G(i-1,j-1)+G(i+1,j+1)-2G(i,j)|$$

$$E_{GD2}(i,j)=|G(i+1,j-1)+G(i-1,j+1)-2G(i,j)|.$$

In the above equations, G(i, j) represents the G value of the current coordinate, G(i−1, j−1) represents a G value which is adjacent to the upper left of the current coordinate on a G color area, G(i+1, j+1) represents a G value which is adjacent to the lower right of the current coordinate on the G color area, G(i+1, j−1) represents a G value which is adjacent to the lower left of the current coordinate on the G color area, and G(i−1, j+1) represents a G value which is adjacent to the upper right of the current coordinate on the G color area.

Then, in operation S142, the G color area processor 121 compares the first diagonal directional image gradient value $E_{GD1}(i, j)$ with the second diagonal directional image gradient value $E_{GD2}(i, j)$, selects the smaller value $MIN(E_{GD1}, E_{GD2})$ from the two values $E_{GD1}(i, j)$ and $E_{GD2}(i, j)$, and compares the selected value $MIN(E_{GD1}, E_{GD2})$ with a second threshold value Th2.

(2-1) First Sub-Mode of the Second Mode

If it is determined in operation S142 that the selected value $MIN(E_{GD1}, E_{GD2})$ does not exceed the second threshold value Th2, operation S143 proceeds, in which the G color area processor 121 executes a first sub-mode for performing image denoising on the G color using diagonal components. In the first sub-mode, the first diagonal directional image gradient value $E_{GD1}(i, j)$ is compared with the second diagonal directional image gradient value $E_{GD2}(i, j)$, and image denoising is performed on the G color according to the result of the comparison.

If the first diagonal directional image gradient value $E_{GD1}(i, j)$ exceeds the second diagonal directional image gradient value $E_{GD2}(i, j)$, image denoising is performed on the G color of the current pixel using G color values which are in the second diagonal direction. In other words, image smoothing is performed in the second diagonal direction, according to the following equation:

$$G(i,j)=\{G(i+1,j-1)+2G(i,j)+G(i-1,j+1)\}/4.$$

If the second diagonal directional image gradient value $E_{GD2}(i, j)$ exceeds the first diagonal directional image gradient value $E_{GD1}(i, j)$, image denoising is performed on the G color of the current pixel using G color values which are in the first diagonal direction. In other words, image smoothing is performed in the first diagonal direction, according to the following equation:

$$G(i,j)=\{G(i-1,j-1)+2G(i,j)+G(i+1,j+1)\}/4.$$

If the first diagonal directional image gradient value $E_{GD1}(i, j)$ is equal to the second diagonal directional image gradient value $E_{GD2}(i, j)$, image denoising is performed on the G color of the current pixel using G color values which are in the first and second diagonal directions. In other words, image smoothing is performed in the first and second diagonal directions, according to the following equation:

$$G(i,j)=\{4G(i,j)+G(i+1,j+1)+G(i-1,j-1)+G(i+1,j-1)+G(i-1,j+1)\}/8.$$

At this point, an equation used for performing image denoising on the G color can be optimally defined in various ways by repeatedly performing experiments, etc.

(2-2) Second Sub-Mode of the Second Mode

Meanwhile, if it is determined in operation S142 that the selected value MIN($E_{GD1}$, $E_{GD2}$) exceeds the second threshold value Th2, operation S144 proceeds, in which the G color area processor 121 executes a second sub-mode for eliminating impulse noise. In the second sub-mode, an average value of G color values of pixels adjacent to the current pixel is calculated using the following equation, and the average value is assigned as a new G color value to the current pixel, thereby eliminating impulse noise.

$$G(i,j)=\{G(i+1,j+1)+G(i-1,j-1)+G(i+1,j-1)+G(i-1,j+1)\}/4$$

At this point, an equation used for eliminating impulse noise can be optimally defined in various ways by repeatedly performing experiments, etc.

In this way, if operation S100, in which image denoising is performed on the G color of the G color area using the 4-directional image gradient information, is complete, operation S200 is performed.

Figure 10:
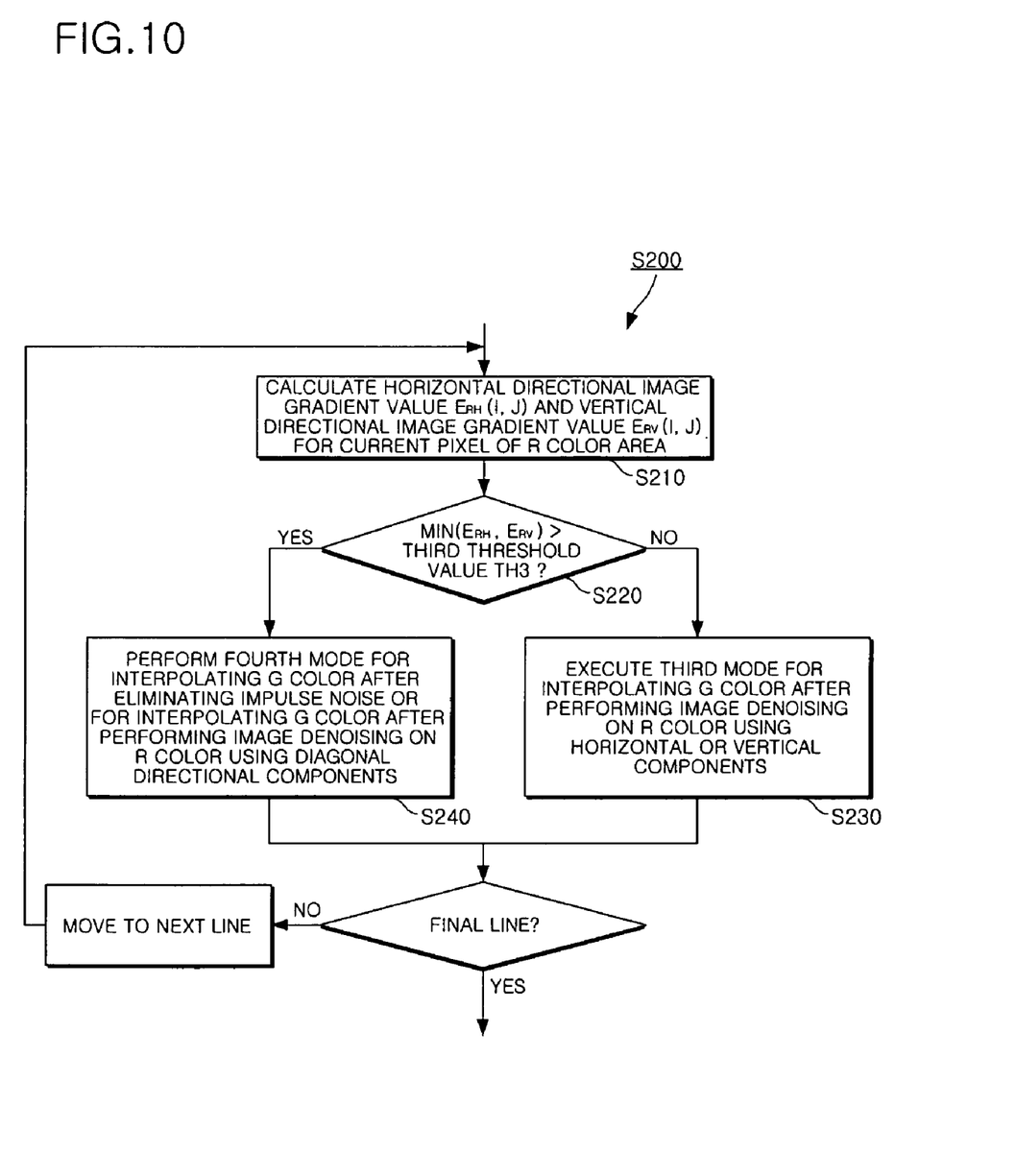
FIG. 10 is a flowchart of operation S200 illustrated in FIG. 7 according to an embodiment of the present invention.

FIG. 10 is a flowchart showing in detail operation S200 illustrated in FIG. 7. For convenience of description, FIG. 10 shows only the case where operation S200 is applied to an R color, but operation 200 can also be applied to a B color. First, in operation S210, the R/B color area processor 122 calculates a horizontal directional image gradient value $E_{RH}(i, j)$ and a vertical directional image gradient value $E_{RV}(i, j)$ for a current pixel of an R color area. At this point, equations used for calculating the horizontal and vertical directional image gradient values $E_{RH}(i,j)$ and $E_{RV}(i,j)$ can be optimally defined in various ways by repeatedly performing experiments, etc.

For example, in the case of an R color, equations used for obtaining the horizontal and vertical directional image gradient values $E_{RH}(i, j)$ and $E_{RV}(i, j)$ can be defined as follows:

$$E_{RH}(i,j)=|R(i,j-2)+R(i,j+2)-2R(i,j)|+|G(i,j-1)-G(i,j+1)|$$

$$E_{RV}(i,j)=|R(i-2,j)+R(i+2,j)-2R(i,j)|+|G(i,j-1)-G(i,j+1)|.$$

In the above Equations, R(i, j) represents the R value of the current coordinate, R(i, j−2) represents an R value which is located to the left of the current coordinate on an R color area, R(i, j+2) represents an R value which is located to the right of the current coordinate on the R color area, R(i−2, j) represents an R value which is located above the current coordinate on the R color area, R(i+2, j) represents an R value which is located below the current coordinate on the R color area, G(i, j−1) represents a G value which is adjacent to the left of the current coordinate on the R color area, and G(i, j+1) represents a G value which is adjacent to the right of the current coordinate on the R color area. The above equations can also be applied to a B color in the same way.

Then, in operation S220, the R/B color area processor 122 compares the horizontal directional image gradient value $E_{RH}(i, j)$ with the vertical directional image gradient value $E_{RV}(i, j)$, selects the smaller value MIN($E_{RH}$, $E_{RV}$) from the two values $E_{RH}(i,j)$ and $E_{RV}(i,j)$, and compares the selected value MIN($E_{RH}$, $E_{RV}$) with a third threshold value Th3. Likewise, operation S220 can be applied to a B color.

(3) Third Mode

If it is determined in operation S220 that the selected value MIN($E_{RH}$, $E_{RV}$) does not exceed the third threshold value Th3, operation S230 proceeds, in which the R/B color area processor 122 executes a third mode for interpolating the G color after performing image denoising on the R or B color using horizontal or vertical components. In the third mode, the horizontal directional image gradient value $E_{RH}(i, j)$ is compared with the vertical directional image gradient value $E_{RV}(i, j)$, and image denoising is performed according to the result of the comparison.

If the vertical directional image gradient value $E_{RV}(i, j)$ exceeds the horizontal directional image gradient value $E_{RH}(i, j)$, image denoising is performed on the R or B color of the current pixel using R or B color values which are in the horizontal direction. In other words, image smoothing is performed in the horizontal direction, and then the G color of the current pixel is interpolated, according to the following equations:

$$R(i,j)=\{R(i,j-2)+2R(i,j)+R(i,j+2)\}/4$$

$$G(i,j)=\{2R(i,j)+2G(i,j-1)+2G(i,j+1)-R(i,j-2)-R(i,j+2)\}/4.$$

The upper equation is used to perform image denoising on the R color, and the lower equation is used to interpolate the G color. An equation used for performing image denoising on the G color is the same as that for performing image denoising on the R color.

If the horizontal directional image gradient value $E_{RH}(i, j)$ exceeds the vertical directional image gradient value $E_{RV}(i,j)$, image denoising is performed on the R or B color of the current pixel using R or B color values which are in the vertical direction. In other words, image smoothing is performed in the vertical direction, and then the G color of the current pixel is interpolated, according to the following equations:

$$R(i,j)=\{R(i-2,j)+2R(i,j)+R(i+2,j)\}/4$$

$$G(i,j)=\{2R(i,j)+2G(i-1,j)+2G(i+1,j)-R(i-2,j)-R(i+2,j)\}/4.$$

Here, the upper equation is used to performing image denoising on the R color, and the lower equation is used to interpolate the G color. The equation used for performing image denoising on the B color is the same as that for performing image denoising on the R color.

If the horizontal directional image gradient value $E_{RH}(i, j)$ is equal to the vertical directional image gradient value $E_{RV}(i, j)$, image denoising is performed on the R or B color of the current pixel using the R or B color values which are in the horizontal and vertical directions. In other words, image smoothing is performed in the horizontal and vertical directions, and then the G color of the current pixel is interpolated, according to the following equations:

$$R(i,j)=\{4R(i,j)+R(i-2,j)+R(i+2,j)+R(i,j+2)+R(i,j-2)\}/8$$

$$G(i,j)=\{G(i-1,j)+G(i+1,j)+G(i,j-1)+G(i,j+1)\}/4.$$

Here, the upper equation is used to perform image denoising on the R color and the lower equation is used to interpolate the G color. The equation used for performing image denoising on the B color is the same as that for performing image denoising on the R color.

Equations used for performing image denoising on the R or B color, and equations used for interpolating the G color can be optimally defined in various ways by repeatedly performing experiments, etc.

(4) Fourth Mode

Meanwhile, if it is determined in operation S220 that the selected value MIN($E_{RH}$, $E_{RV}$) exceeds the third threshold value Th3, operation S240 proceeds, in which the R/B color area processor 122 enters a fourth mode for interpolating the G color after eliminating impulse noise or for interpolating the G color after performing image denoising on the R or B color using diagonal directional components.

Figure 11:
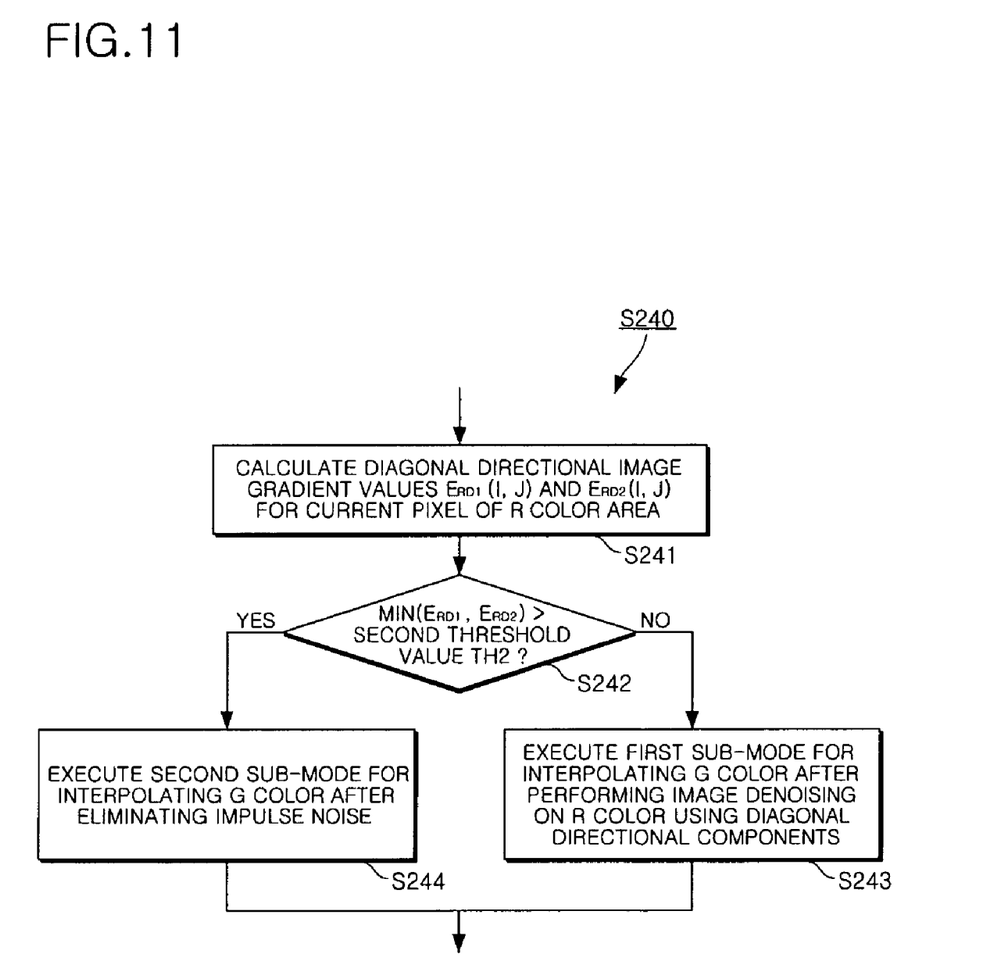
FIG. 11 is a flowchart of operation S240 illustrated in FIG. 10 according to an embodiment of the present invention.

FIG. 11 is a flowchart showing in detail operation S240 illustrated in FIG. 10. For convenience of description, FIG. 11 shows only the case where operation S240 is applied to the R color, but, operation S240 can also be applied to the B color. First, in operation S241, the R/B color area processor 122 calculates first and second diagonal directional image gradient values $E_{RD1}(i, j)$ and $E_{RD2}(i, j)$ for the current pixel of the R color area. Equations used for calculating the first and second diagonal directional image gradient values can be optimally defined in various ways by repeatedly performing experiments, etc.

For example, the first and second diagonal directional image gradient values $E_{RD1}(i, j)$ and $E_{RD2}(i, j)$ for the R color can be defined as follows:

$E_{RD1}(i,j)=|R(i-2,j-2)+R(i+2,j+2)-2R(i,j)|+|B(i-1,j-1)-B(i+1,j+1)|$ $E_{RD2}(i,j)=|R(i+2,j-2)+R(i-2,j+2)-2R(i,j)|+|B(i+1,j-1)-B(i-1,j+1)|$.

In the above Equations, R(i, j) represents a R value of the current coordinate, R(i−2, j−2) represents an R value which is located to the upper left of the current coordinate on an R color area, R(i+2, j+2) represents an R value which is located to the lower right of the current coordinate on the R color area, R(i+2, j−2) represents an R value which is located to the upper left of the current coordinate on the R color area, R(i−2, j+2) represents an R value which is located to the upper right of the current coordinate on the R color area, and B(i−1, j−1) represents a B value which is adjacent to the upper left of the current coordinate on a B color area, B(i+1, j+1) represents a B value which is adjacent to the lower right of the current coordinate on the B color area, B(i+1,j−1) represents a B value which is adjacent to the lower left of the current coordinate on the B color area, and B(i−1, j+1) represents a B value which is adjacent to the upper right of the current coordinate on the B color area. The equations can be applied to the B color in the same way.

Then, in operation S242, the R/B color area processor 122 compares the first diagonal directional image gradient value $E_{RD1}(i,j)$ with the second diagonal directional image gradient value $E_{RD2}(i, j)$, selects the smaller value MIN($E_{RD1}$, $E_{RD2}$) from the two values $E_{RD1}(i, j)$ and $E_{RD2}(i, j)$, and compares the selected value MIN($E_{RD1}$, $E_{RD2}$) with the second threshold value Th2.

(4-1) First Sub-Mode of the Fourth Mode

If it is determined in operation S242 that the selected value MIN($E_{RD1}$, $E_{RD2}$) does not exceed the second threshold value Th2, operation S243 proceeds, in which the R/B color area processor 122 executes a first sub-mode for interpolating the G color after performing image denoising on the R or B color using diagonal directional components. In the first sub-mode, the first diagonal directional image gradient value $E_{RD1}(i,j)$ is compared with the second diagonal directional image gradient value $E_{RD2}(i, j)$, and image denoising and G color interpolation are performed according to the result of the comparison. As a result, picture quality can be improved by performing G color interpolation in the diagonal directions, as well as in the horizontal or vertical direction in which a minimum value is determined by comparison.

If the first diagonal directional image gradient value $E_{RD1}$ (i, j) exceeds the second diagonal directional image gradient value $E_{RD2}(i, j)$, image denoising is performed on the R or B color of the current pixel, using R or B color values which are in the second diagonal direction. In other words, image smoothing is performed in the second diagonal direction, and then the G color of the current pixel is interpolated, according to the following equations:

$$R(i, j) = \{R(i-2, j+2) + 2R(i, j) + R(i+2, j-2)\}/4$$

$$G(i, j) = G(i, j)_{UD2}, \text{ if}$$

$$|G(i, j)_{UD2} - R(i, j)| < |G(i, j)_{LD2} - R(i, j)|$$

$$= G(i, j)_{LD2}, \text{ else if } |G(i, j)_{UD2} - R(i, j)| >$$

$$|G(i, j)_{LD2} - R(i, j)|$$

$$= \{G(i, j)_{UD2} + G(i, j)_{LD2}\}/2, \text{ else}$$

$$G(i, j)_{UD2} = \{G(i-1, j) + G(i, j-1)\}/2$$

$$G(i, j)_{LD2} = \{G(i+1, j) + G(i, j+1)\}/2.$$

Here, the upper equation is used to perform image denoising on the R color, and the lower equations are used to interpolate the G color. Equations used for performing image denoising on the B color are the same as those used for performing image denoising on the R is color.

If the second diagonal directional image gradient value $E_{RD2}(i, j)$ exceeds the first diagonal directional image gradient value $E_{RD1}(i, j)$, image denoising is performed on the R color of the current pixel, using the R color values which are in the first diagonal direction. In other words, image smoothing is performed in the first diagonal direction, and then the G color of the current pixel is interpolated, according to the following equations:

$$R(i, j) = \{R(i-2, j-2) + 2R(i, j) + R(i+2, j+2)\}/4$$

$$G(i, j) = G(i, j)_{UD1}, \text{ if}$$

$$|G(i, j)_{UD1} - R(i, j)| < |G(i, j)_{LD1} - R(i, j)|$$

$$= G(i, j)_{LD1}, \text{ else if } |G(i, j)_{UD1} - R(i, j)| >$$

$$|G(i, j)_{LD1} - R(i, j)|$$

$$= \{G(i, j)_{UD1} + G(i, j)_{LD1}\}/2, \text{ else}$$

$$G(i, j)_{UD1} = \{G(i-1, j) + G(i, j+1)\}/2$$

$$G(i, j)_{LD1} = \{G(i+1, j) + G(i, j-1)\}/2.$$

Here, the upper equation is used to perform image denoising on the R color, and the lower equations are used to interpolate the G color. The equation used for performing image denoising on the B color is the same as that used for performing image denoising on the R color.

If the first diagonal directional image gradient value $E_{RD1}$ (i, j) is equal to the second diagonal directional image gradient value $E_{RD2}(i, j)$, image denoising is performing on the R color of the current pixel, using R color values which are in the first and second diagonal directions. In other words, image smoothing is performed in the first and second diagonal directions, and then the G color of the current pixel is interpolated, according to the following equations:

$R(i,j)=\{4R(i,j)+R(i-2,j+2)+R(i+2,j-2)+R(i-2,j-2)+R(i+2,j+2)\}/8$ $G(i,j)=\{G(i-1,j)+G(i,j-1)+G(i,j+1)+G(i+1,j1)\}/4.$

Here, the upper equation is used to perform image denoising on the R color, and the lower equation is used to interpolate the G color. The equation used for performing image denoising on the B color is the same as that used for performing image denoising on the R color.

Equations used for performing image denoising on the R color, and equations used for interpolating the G color can be optimally defined in various ways by repeatedly performing experiments, etc.

(4-2) Second Sub-Mode of the Fourth Mode

If it is determined in operation S242 that the selected value MIN($E_{RD1}$, $E_{RD2}$) exceeds the second threshold value Th2, operation S244 proceeds, in which the R/B color area processor 122 executes a second sub-mode for interpolating the G color after eliminating impulse noise. In the second sub-mode, an average value of R color values of the pixels adjacent to the current pixel is calculated and assigned as a new R color value to the current pixel to thus reduce impulse noise, and then the G color is interpolated, according to the following equations:

$$R(i,j)=\{R(i+2,j)+R(i-2,j)+R(i,j-2)+R(i,j+2)\}/4$$

$$G(i,j)=\{G(i+1,j)+G(i-1,j)+G(i,j-1)+G(i,j+1)\}/4.$$

Here, the upper equation is used to perform image denoising on the R color, and the lower equation is used to interpolate the G color. The equation used for performing image denoising on the B color is the same as that used for performing image denoising on the R color.

Equations used for performing image denoising on the R color, and equations used for interpolating the G color can be optimally defined in various ways by repeatedly performing experiments, etc.

As such, if operation S200, in which image denoising is performed on the R or B color of the R or B color areas using the 4-directional image gradient information, is complete, operation S10 for performing image denoising and G color interpolation using the 4-directional image gradient information is terminated.

Then, the image signal processing apparatus performs interpolation on the R and B color is in operation S20, thereby creating an RGB full color image.

5) Post-Processing

Figure 12:
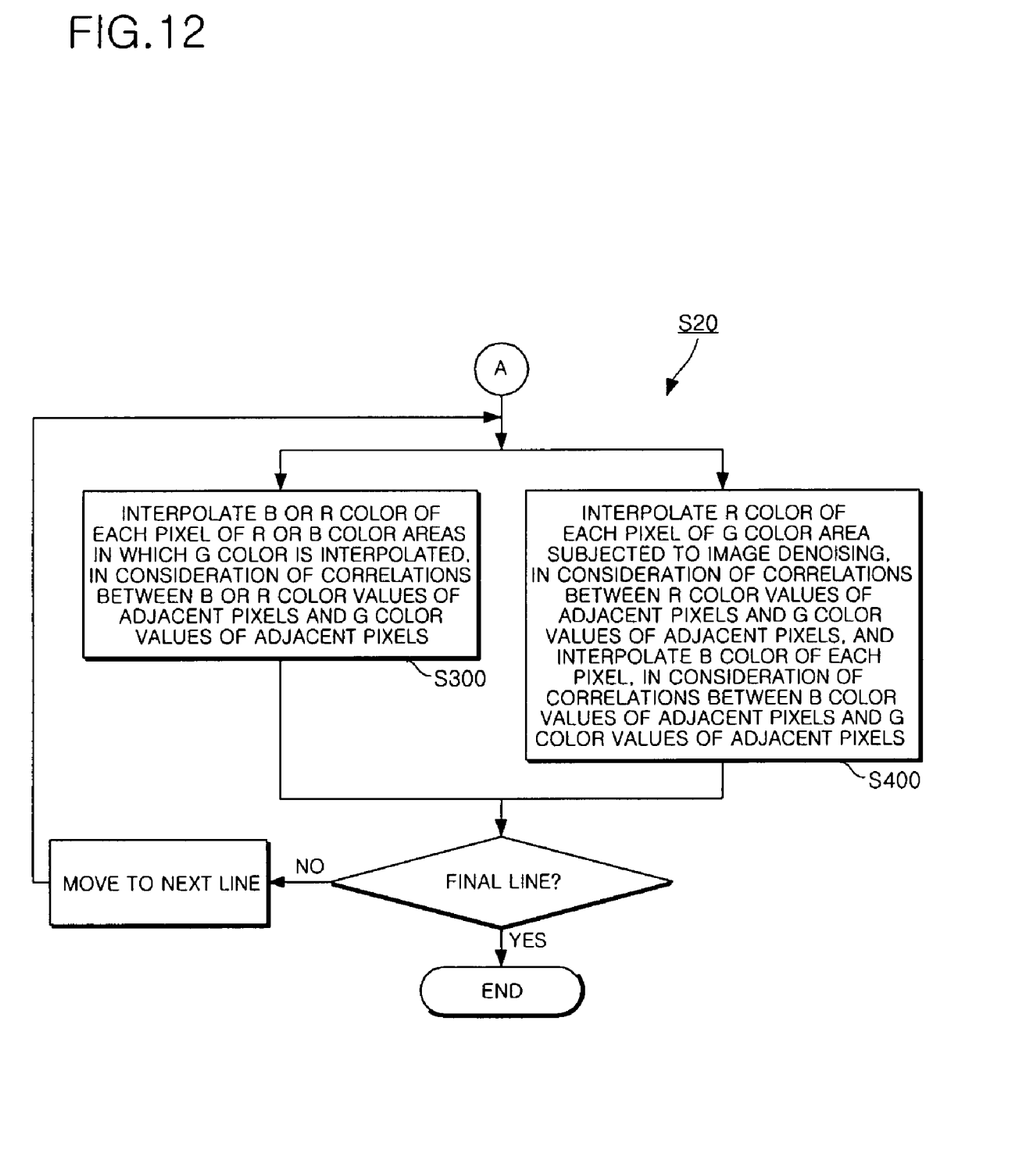
FIG. 12 is a flowchart of operation S20 illustrated in FIG. 6 according to an embodiment of the present invention.

FIG. 12 is a flowchart showing in detail operation S20 illustrated in FIG. 6. As shown in FIG. 12, in operation S300, the R/B color area processor 122 interpolates the B or R color of each pixel of the R or B color areas in which the G color has been interpolated, in consideration of correlations and differences between the B or R color values of the adjacent pixels and the interpolated G color values of the adjacent pixels, for example, according to the following equations:

$$B(i,j)=G(i,j)+\{B(i-1,j-1)-G(i-1,j-1)+B(i-1,j+1)-G(i-1,j+1)+B(i+1,j-1)-G(i+1,j-1)+B(i+1,j+1)-G(i+1,j+1)\}/4.$$

Here, the equation used for interpolating the R color is the same as that used for interpolating the B color. Equations used for interpolating the B or R color can be optimally defined in various ways by repeatedly performing experiments, etc.

Meanwhile, in operation S400, the G color area processor 121 interpolates the R color of each pixel of the G color area subjected to image denoising, in consideration of correlations between the R color values of the adjacent pixels and the interpolated G color values of the adjacent pixels, and interpolates the B color of the each pixel, in consideration of correlations or differences between the B color values of the adjacent pixels and the interpolated G color values of the adjacent pixels, according to the following equations:

$$R(i,j)=G(i,j)+\{R(i,j-1)-G(i,j-1)+R(i,j+1)-G(i,j+1)\}/2$$

$$B(i,j)=G(i,j)+\{B(i-1,j)-G(i-1,j)+B(i+1,j)-G(i+1,j)\}/2.$$

Equations used for interpolating the B or R color can be optimally defined in various ways by repeatedly performing experiments, etc.

Accordingly, in the image signal processing apparatus according to the current embodiment of the present invention, by simultaneously performing in an integrated manner image denoising and interpolation, using 4-directional image gradient information which defines differences in color brightness between adjacent pixels on the basis of edge direction information obtained from a bayer image output from an image sensor, the amount of calculations required for image denoising and interpolation can be reduced. Therefore, the image signal processing apparatus according to the current embodiment of the present invention is more effective than conventional techniques, in view of picture quality, processing speed, and costs.

6) Summary

Figure 13:
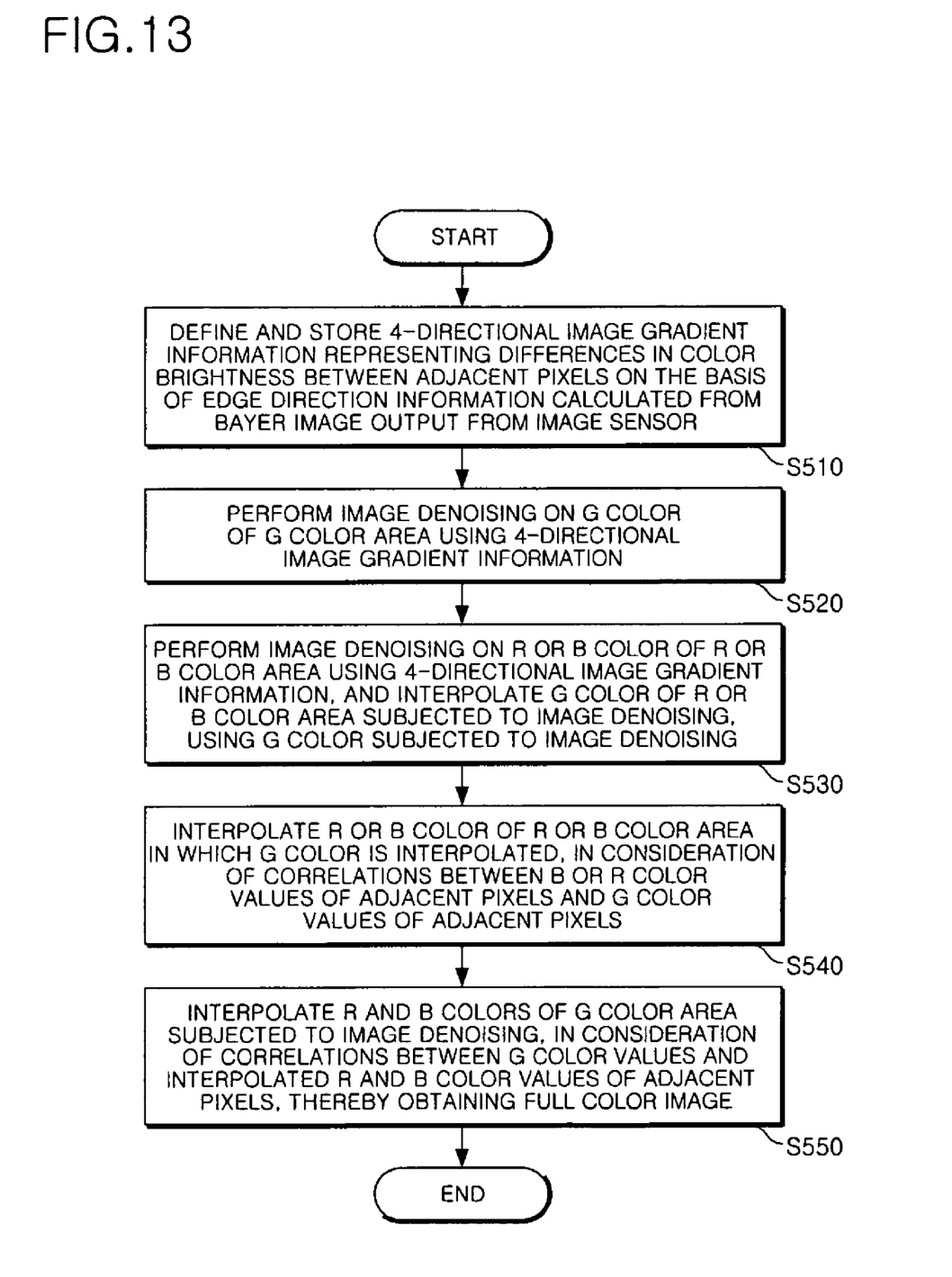
FIG. 13 is a flowchart of an image signal processing method according to an embodiment of the present invention.

An image signal processing method of the image signal processing apparatus according to the current embodiment of the present invention will now be described with reference to FIG. 13. FIG. 13 is a flowchart of an image signal processing method according to an embodiment of the present invention.

First, in operation S510, the image signal processing apparatus defines and stores 4-directional image gradient information representing differences in color brightness between adjacent pixels on the basis of edge direction information calculated from a bayer image output from an image sensor. Since the 4-directional image gradient information has been described above, a repeated description thereof will be omitted.

Then, in operation S520, the image signal processing apparatus performs image denoising on the G color of the G color area using the 4-directional image gradient information. Since details about an embodiment for performing image denoising on the G color using the 4-directional image gradient information have been described above, a repeated description thereof will be omitted.

If image denoising is performed on the G color area in operation S520, in operation S530, the image signal processing apparatus performs image denoising on the R or B color of the R or B color area using the 4-directional image gradient information, and interpolates the G color of the R or B color area subjected to image denoising using the G color subjected to image denoising in operation S520. Since details about an embodiment for performing image denoising on the R or B color and interpolating the G color have been described above, a detailed description thereof will be omitted.

Then, in operation S540, the image signal processing apparatus interpolates the R or B color of the R or B color area subjected to G color interpolation in operation S530, in consideration of correlations between the B or R color values of the adjacent pixels and the interpolated G color values of the adjacent pixels. Thus, the G and B colors of the R color area are interpolated, and the G and R colors of the B color area are interpolated, thereby creating a full color image. Since details about an embodiment for interpolating the B or R color have been described above, a repeated description thereof will be omitted.

Finally, in operation S550, the image signal processing apparatus interpolates the R and B colors of the G color area subjected to image denoising in operation S520, in consideration of correlations or differences between the interpolated G color values and the R and B color values of the adjacent R or B color area interpolated in operation S540, thereby obtaining a full color image.

Accordingly, in the image signal processing apparatus according to the current embodiment of the present invention, by simultaneously performing in an integrated manner image denoising and interpolation, using 4-directional image gradient information which defines differences in color brightness between adjacent pixels on the basis of edge direction information obtained from a bayer image output from an image sensor, unlike the conventional method which sequentially performs image denoising and interpolation, the amount of calculations required for image denoising and interpolation can be reduced. Therefore, it is possible to efficiently and simultaneously perform image denoising and interpolation, to improve picture quality and processing speed, and to obtain a cost reduction due to, for example, saving power required for calculations.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An image signal processing (ISP) apparatus which processes an image signal output from an image sensor, comprising:
   a storage unit storing 4-directional image gradient information which defines a difference in color brightness between adjacent pixels on the basis of edge direction information obtained from a bayer image output from the image sensor;
   an image processor simultaneously processing in an integrated manner image denoising and interpolation using the 4-directional image gradient information stored in the storage unit.

2. The image signal processing apparatus of claim 1, further comprising:
   a G color area processor performing image denoising and interpolation on a G color area using the 4-directional image gradient information; and
   an R/B color area processor performing image denoising and interpolation on an R color area or a B color area using the 4-directional image gradient information and the G color area subjected to the image denoising and the interpolation by the G color area processor.

3. The image signal processing apparatus of claim 1, wherein the G color area processor performs the image denoising on the G color area using the 4-directional image gradient information before performing the interpolation on the G color area.

4. The image signal processing apparatus of claim 3, wherein the R/B color area processor performs image denoising on an R color or a B color of the R color area or the B color area, using the 4-directional image gradient information, and interpolates a G color of the R color area or the B color area, subjected to the image denoising, using the G color subjected to the image denoising by the G color area processor.

5. The image signal processing apparatus of claim 4, wherein the R/B color area processor interpolates a B color or an R color of an R color area or a B color area in which a G color is interpolated.

6. The image signal processing apparatus of claim 3, wherein the G color area processor interpolates an R color and a B color of the G color area subjected to the image denoising using the R color or the B color of the R color area or the B color area subjected to the image denoising.

7. The image signal processing apparatus of claim 3, wherein the G color area processor calculates a horizontal directional image gradient value and a vertical directional image gradient value for a current pixel of the G color area, compares the horizontal directional image gradient value with the vertical directional image gradient value, selects the smaller image gradient value from the horizontal directional image gradient value and the vertical directional image gradient value, compares the selected image gradient value with a first threshold value, executing a first mode for performing image denoising on the G color using a horizontal direction component or a vertical direction component if the selected image gradient value does not exceed the first threshold value, and executing a second mode for performing image denoising on the G color using impulse noise or a diagonal directional component if the selected image gradient value exceeds the first threshold value.

8. The image signal processing apparatus of claim 7, wherein the execution of the first mode comprises comparing the horizontal directional image gradient value with the vertical directional image gradient value, performing image denoising on the G color of the current pixel using G color values which are in the horizontal direction if the vertical directional image gradient value exceeds the horizontal directional image gradient value, performing image denoising on the G color of the current pixel using G color values which are in the vertical direction if the horizontal directional image gradient value exceeds the vertical directional image gradient value, and performing image denoising on the G color of the current pixel using G color values which are in the horizontal direction and the vertical direction if the horizontal directional image gradient value is equal to the vertical directional image gradient value.

9. The image signal processing apparatus of claim 7, wherein the execution of the second mode comprises calculating a first diagonal directional image gradient value and a second diagonal directional image gradient value for the current pixel of the G color area, comparing the first diagonal directional image gradient value with the second diagonal directional image gradient value, selecting the smaller image gradient value from the first diagonal directional image gradient value and the second diagonal directional image gradient value, comparing the selected image gradient value with a second threshold value, executing a first sub-mode for performing image denoising on the G color using a diagonal direction component if the selected image gradient value does not exceed the second threshold value, and executing a second sub-mode for eliminating impulse noise if the selected image gradient value exceeds the second threshold value.

10. The image signal processing apparatus of claim 9, wherein the execution of the first sub-mode of the second mode comprises comparing the first diagonal directional image gradient value with the second diagonal directional image gradient value, performing image denoising on the G color of the current pixel using G color values which are in the second diagonal direction if the first diagonal directional image gradient value exceeds the second diagonal directional image gradient value, performing image denoising on the G color of the current pixel using G color values which are in the first diagonal direction if the second diagonal directional image gradient value exceeds the first diagonal directional image gradient value, and performing image denoising on the G color of the current pixel using G color values which are in the first diagonal direction and the second diagonal direction if the first diagonal directional image gradient value is equal to the second diagonal directional image gradient value.

11. The image signal processing apparatus of claim 9, wherein the execution of the second sub-mode of the second mode comprises calculating an average value of G color values of pixels adjacent to the current pixel, and assigning the average value as a new G color value to the current pixel, thus eliminating impulse noise.

12. The image signal processing apparatus of claim 4, wherein the R/B color area processor calculates a horizontal directional image gradient value and a vertical directional image gradient value for a current pixel of the R color area or the B color area, compares the horizontal directional image gradient value with the vertical directional image gradient value, selects the smaller image gradient value from the horizontal directional image gradient value and the vertical directional image gradient value, compares the selected image gradient value with a third threshold value, executes a third mode, for performing image denoising on the R color or the B color using a horizontal direction component or a vertical direction component and then interpolating the G color, if the selected image gradient value does not exceed the third threshold value, and executes a fourth mode, for eliminating impulse noise and then interpolating the G color or for performing image denoising on the R color or the B color using a diagonal direction component and then interpolating the G color, if the selected image gradient value exceeds the third threshold value.

13. The image signal processing apparatus of claim 12, wherein the execution of the third mode comprises comparing the horizontal directional image gradient value with the vertical directional image gradient value, performing image denoising on the R color or the B color of the current pixel using R color values or B color values which are in the horizontal direction and then interpolating the G color of the current pixel if the vertical directional image gradient value exceeds the horizontal directional image gradient value, performing image denoising on the R color or the B color of the current pixel using R color values or B color values which are in the vertical direction and then interpolating the G color of the current pixel if the horizontal directional image gradient value exceeds the vertical directional image gradient value, and performing image denoising on the R color or the B color of the current pixel using R color values or B color values which are in the horizontal direction and the vertical direction and then interpolating the G color of the current pixel if the vertical directional image gradient value is equal to the horizontal directional image gradient value.

14. The image signal processing apparatus of claim 12, wherein the fourth mode is executed by calculating a first diagonal directional image gradient value and a second diagonal directional image gradient value for the current pixel of the R color area or the B color area, comparing the first diagonal directional image gradient value with the second diagonal image gradient value, selecting the smaller image gradient value from the first diagonal directional image gradient value and the second diagonal directional image gradient value, comparing the selected image gradient value with a second threshold value, executing a first sub-mode, for performing image denoising on the R color or the B color using a diagonal direction component and interpolating the G color, if the selected image gradient value does not exceed the second threshold value, and executing a second sub-mode, for eliminating impulse noise and then interpolating the G color, if the selected image gradient value exceeds the second threshold value.

15. The image signal processing apparatus of claim 14, wherein the execution of the first sub-mode of the fourth mode comprises comparing the first diagonal directional image gradient value with the second diagonal directional image gradient value, performing image denoising on the R color or the B color of the current pixel using R color values or B color values which are in the second diagonal direction and then interpolating the G color of the current pixel if the first diagonal directional image gradient value exceeds the second diagonal directional image gradient value, performing image denoising on the R color or the B color of the current pixel using R color values or B color values which are in the first diagonal direction and then interpolating the G color of the current pixel if the second diagonal directional image gradient value exceeds the first diagonal directional image gradient value, and performing image denoising on the R color or the B color of the current pixel using R color values or B color values which are in the first diagonal direction and the second diagonal direction and then interpolating the G color of the current pixel if the first diagonal directional image gradient value is equal to the second diagonal directional image gradient value.

16. The image signal processing apparatus of claim 14, wherein execution of the second sub-mode of the fourth mode comprises calculating an average value of R color values or B color values of pixels adjacent to the current pixel, assigning the average value as a new R color value or a new B color value to the current pixel to eliminate impulse noise, and then interpolating the G color.

17. The image signal processing apparatus of claim 5, wherein the R/B color area processor interpolates a B color or an R color of each pixel of the R color area or the B color area in which the G color is interpolated, in consideration of correlations or differences between B color values or R color values of adjacent pixels of the each pixel and interpolated G color values of the adjacent pixels.

18. The image signal processing apparatus of claim 6, wherein the G color area processor interpolates an R color of each pixel of the G color area subjected to the image denoising, in consideration of correlations between R color values of adjacent pixels of the each pixel and G color values of the adjacent pixels, and interpolates a B color of the each pixel, in consideration of correlations and differences between B color values of the adjacent pixels and interpolated G color values of the adjacent pixels.

19. An image signal processing (ISP) method of processing an image signal output from an image sensor, comprising:
defining and storing 4-directional image gradient information representing differences in color brightness between adjacent pixels on the basis of edge direction information obtained from a bayer image output from the image sensor;
performing image denoising on a G color of a G color area using the 4-directional image gradient information; and
performing image denoising on an R color or a B color of an R color area or a B color area using the 4-directional image gradient information, and interpolating a G color of the R color area or the B color area subjected to the image denoising using the G color subjected to the image denoising.

20. The image signal processing method of claim 19, further comprising interpolating a B color or an R color of the R color area or the B color area in which the G color is interpolated, in consideration of correlations between B color values or R color values of adjacent pixels of the R color area or the B color area and interpolated G color values of the adjacent pixels.

21. The image signal processing method of claim 20, further comprising interpolating an R color and a B color of the G color area subjected to image denoising, in consideration of correlations and differences between R color values or B color values of adjacent R color areas or adjacent B color areas of the G color area and interpolated G color values.

* * * * *